United States Patent [19]

Cutler et al.

[11] 4,386,382
[45] May 31, 1983

[54] TIME INDEPENDENT CONTROLLER FOR CASSETTE CHANGING APPARATUS

[75] Inventors: Timothy D. Cutler, Atlanta; Theodore Titus, IV, Tucker, both of Ga.

[73] Assignee: Lanier Business Products, Inc., Atlanta, Ga.

[21] Appl. No.: 191,698

[22] Filed: Sep. 29, 1980

Related U.S. Application Data

[63] Continuation-in-part of Ser. No. 78,232, Sep. 24, 1979.

[51] Int. Cl.³ .................... G11B 15/68; G11B 19/00
[52] U.S. Cl. ...................................... 360/92; 360/69
[58] Field of Search ............... 360/92, 91, 96.5, 96.3, 360/69; 242/197–200; 179/100.1 DR; 369/25, 29–30

[56] References Cited

U.S. PATENT DOCUMENTS

| | | | |
|---|---|---|---|
| 3,758,122 | 9/1973 | Kawaharasaki | 360/92 |
| 3,996,617 | 12/1976 | Cousino | 360/92 |
| 4,071,857 | 1/1978 | Whitney et al. | 360/92 |
| 4,092,679 | 5/1978 | Sander | 360/92 |
| 4,092,685 | 5/1978 | Sander et al. | 360/92 |
| 4,099,209 | 7/1978 | Sander et al. | 360/92 |
| 4,145,724 | 3/1979 | Medding | 360/92 |
| 4,233,638 | 11/1980 | Bolick, Jr. et al. | 360/92 |
| 4,271,440 | 6/1981 | Jenkins et al. | 360/92 |

Primary Examiner—Alfred H. Eddleman
Attorney, Agent, or Firm—Jones & Askew

[57] ABSTRACT

A time independent controller for a novel cassette changer is shown. A cassette changer including a plurality of limit switch inputs (210) and means for detecting occurrence of a failure during a change cycle. The total angular displacement of a driving motor is detected (422) and upon reaching a predetermined angle of displacement (437) a test for an appropriate input (418) is provided. In one disclosed embodiment a read only memory (465) determines the controller state (461–463). Apparatus (426, 427, 450) which is responsive only to the limit switch inputs closing in a pair wise proper sequence is also shown.

7 Claims, 9 Drawing Figures

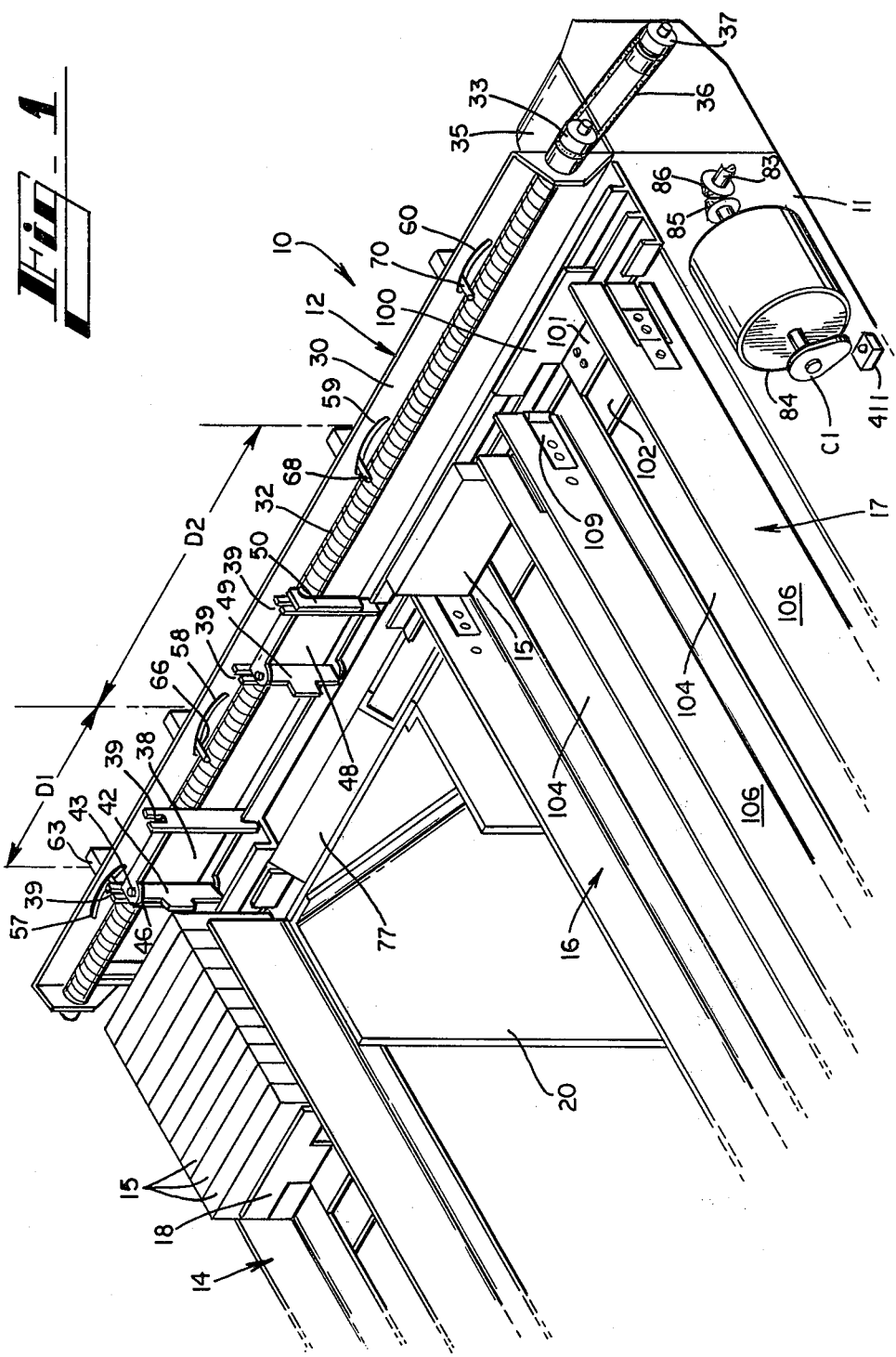

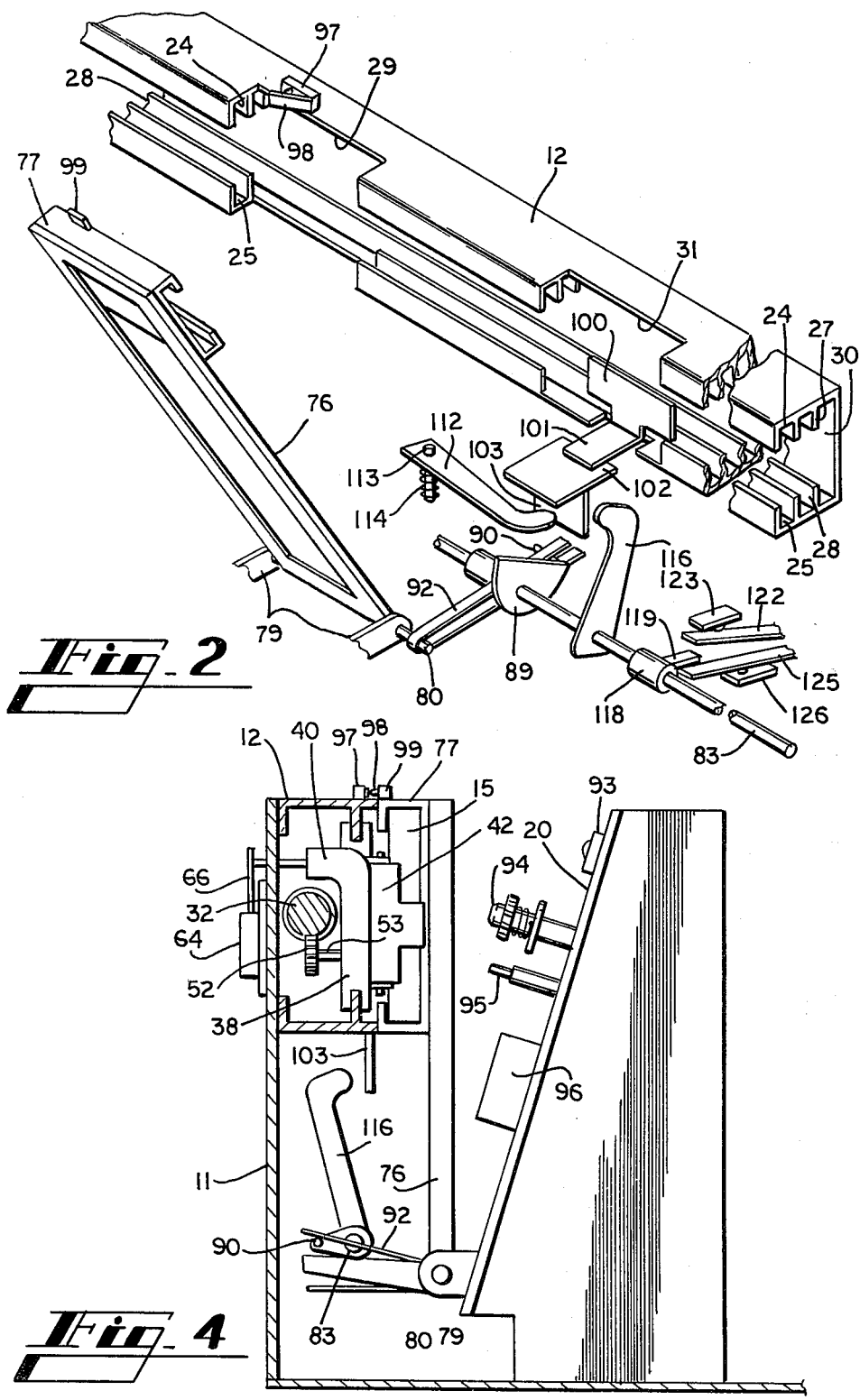

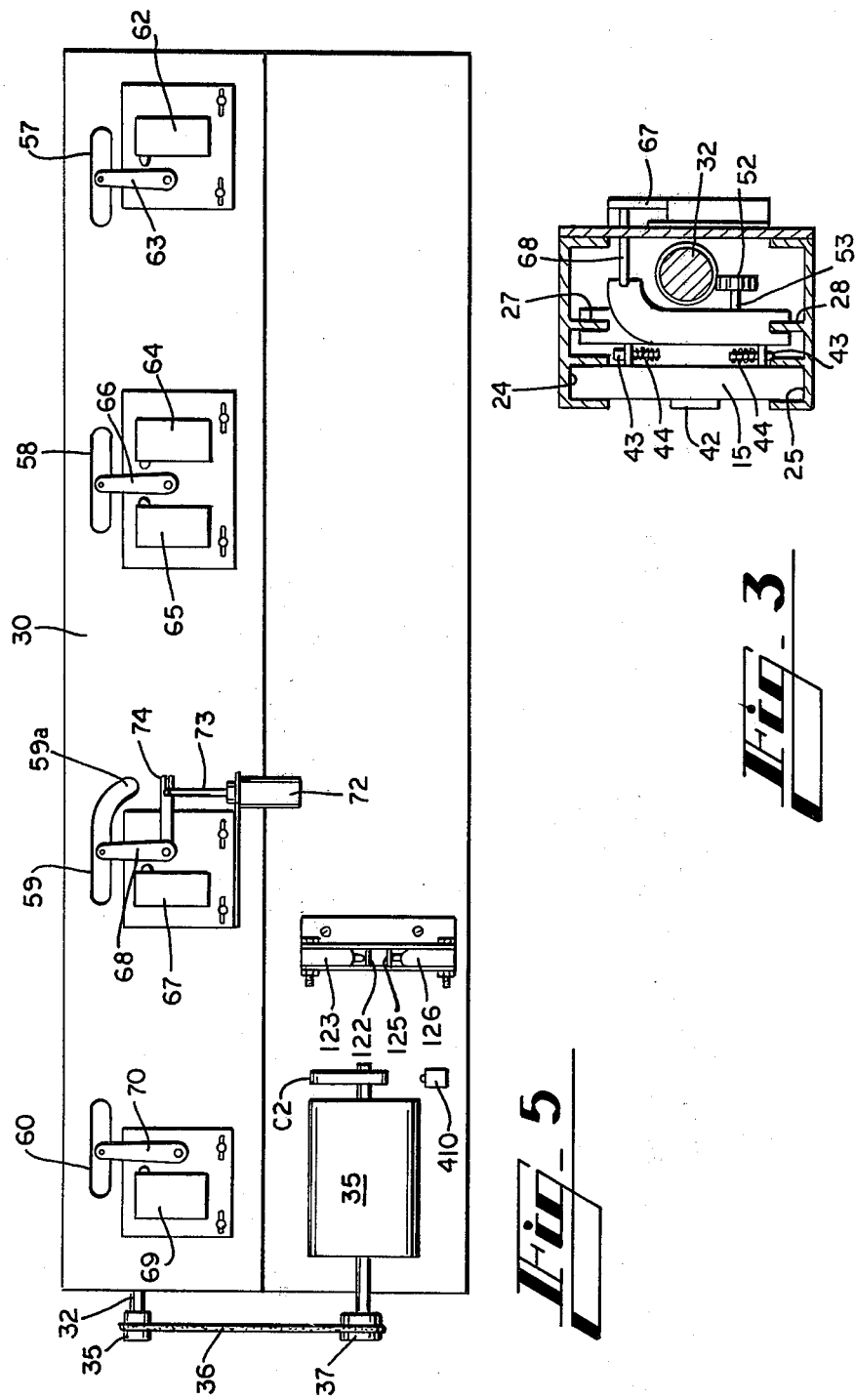

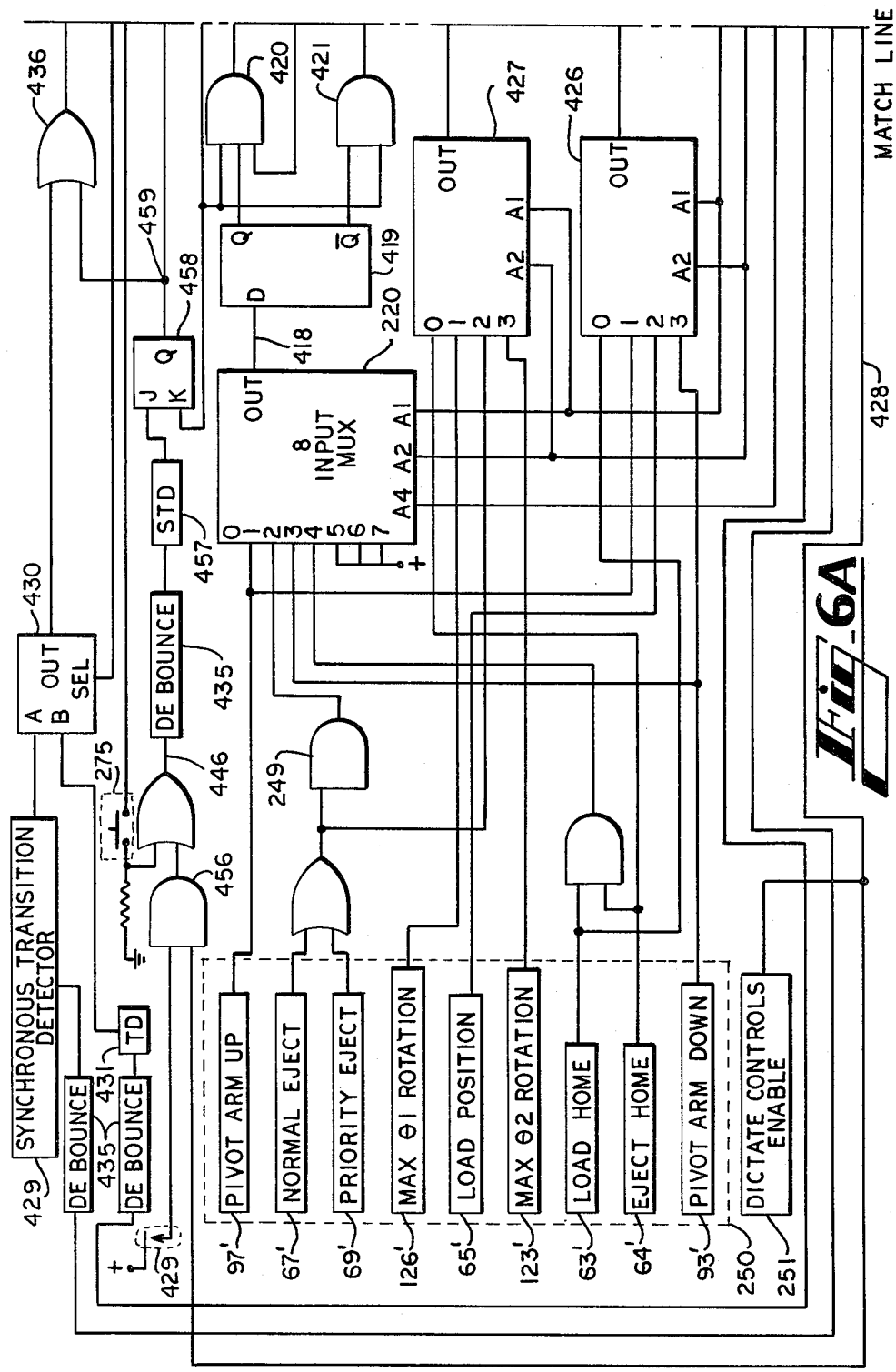

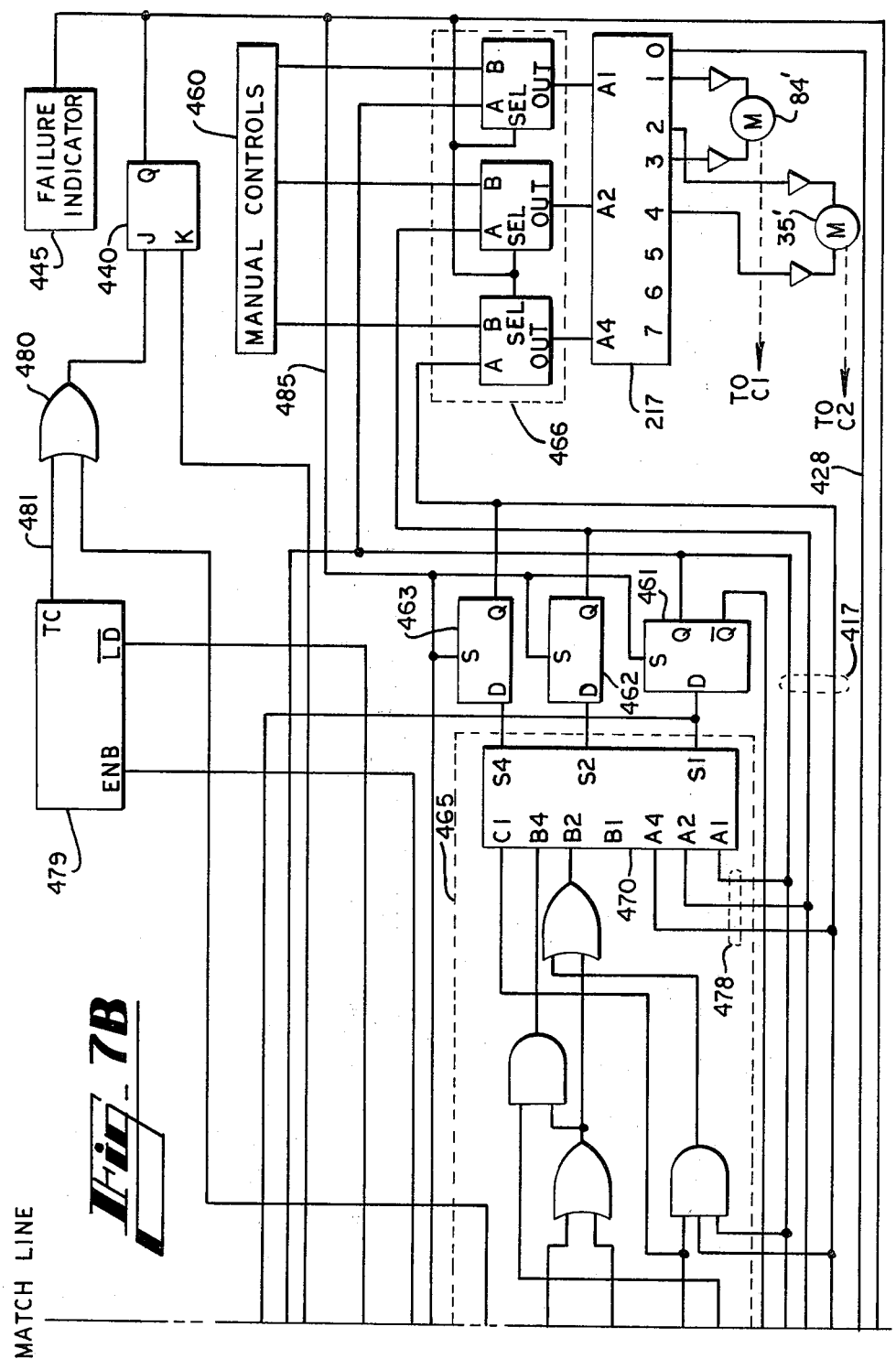

TIME INDEPENDENT CONTROLLER FOR CASSETTE CHANGING APPARATUS

CROSS REFERENCE TO RELATED APPLICATION

This application is a continuation-in-part of Application Ser. No. 078,232 filed Sept. 24, 1979 for CASSETTE CHANGING METHOD AND APPARATUS.

TECHNICAL FIELD

The present invention relates to a device for mechanically handling discrete recording media and more particularly to a simplified controller for a cassette changer in a dictation recording/transcribing system.

BACKGROUND OF THE INVENTION

In recent years the use of automated cassette changing devices in central dictation systems as opposed to endless loop dictation/transcription devices has become increasingly popular. An example of a central dictation system employing cassette devices is shown in U.S. Pat. No. 4,024,354 to Bolick et al. which is assigned to the assignee of the present invention.

While such devices have many advantages over previous recording/transcription units, the necessity of moving a plurality of discrete cassettes from an input store, to a recording position in engagement with a relatively complex mechanical tape transport, and then to an output store has required fairly complex electronic controllers as well as finely machined, and therefore expensive, mechanical parts. It has been particularly troublesome to provide apparatus for moving the cassettes through the above-described path while maintaining the ability to stop the cassettes at particular locations within acceptable mechanical tolerances. An example of a cassette changing device in which the mechanical spacing and alignment of the apparatus which transports cassettes is rather critical is shown in U.S. Pat. No. 4,071, 857 to Whitney et al. A controller for the device shown in the Whitney patent is shown in U.S. Pat. No. 4,099,209 to Sander et al.

Applicant's co-pending application Ser. No. 078,232 filed Sept. 24, 1979 entitled CASSETTE CHANGING METHOD AND APPARATUS discloses an improved cassette changing device employing a combination of positive drive and "soft" (spring and clutch coupled) drive to different mechanical components of the changer. Said application also discloses a controller for the device which will attempt to repeat certain portions of a change cycle and to take corrective action in the event that a failure to complete a portion of a change cycle has taken place. Since the preferred embodiments of the present invention shown herein are usable with the mechanical apparatus disclosed in said co-pending application, Application Ser. No. 078,232 filed Sept. 24, 1979 is hereby incorporated by reference exactly as if said application were set forth herein in its entirety.

By using a combination of positive drive and soft drive, as set forth in said Application Ser. No. 078,232, cassette changing devices which employ motors which turn even in the presence of a jammed condition have been constructed. Therefore, it is possible to employ controllers which do not depend on the amount of time which has elapsed between events but only upon angular movement of a motor shaft or a similar physical quantity.

SUMMARY OF THE INVENTION

The present invention provides a controller for a cassette changing apparatus which is responsive to a physical displacement quantity to change states, control operation, and detect failures. This allows the controller to operate independently of the time required for a predetermined amount of physical displacement to occur. In the preferred embodiments angular ntion takes advantage of unique mechanical aspects of the cassette changer shown in co-pending Application Ser. No. 78,232 to provide a very simple controller for a cassette changing device employing non-positive or soft drive in the mechanical linkage between a motor or equivalent driving means and the apparatus which actually moves the cassettes.

It will therefore be appreciated that a predetermined amount of angular displacement of a driving motor shaft will correspond to a predetermined amount of cassette movement under normal operating conditions. With the non-positive mechanical linkages used in the present invention, the angular displacement of the driving motor shaft will continue even though the cassette moving apparatus jams. Therefore the present invention is constructed to detect a predetermined quantity of angular displacement of the driving motor shaft and then tests to see if the cassette has been successfully moved to the corresponding proper location. If the cassette is at the proper location, normal operation continues and, if not, appropriate action is implemented by the controller.

In the preferred embodiments, two driving motors are used, each of which has a cam attached to its shaft. The cams cause switches to close. A counter is employed to count switch closures and a certain predetermined count thereby correspond to a predetermined angular displacement of the motor shaft.

This arrangement allows embodiments of the present invention to be constructed which will allow proper control of a cassette changing cycle using interchangeable motors of widely varying shaft velocities and allow proper control independently of the time required to move cassettes to and from specific locations in the mechanism.

Accordingly, it is an object of the present invention to provide a controller for a cassette changing recording/transcription device wherein state transitions within the controller are independent of time.

Furthermore, it is an object of the present invention to provide a controller for a cassette changer which is responsive to a predetermined amount of displacement of a driving member, preferably angular displacement of the shaft of a motor in order to test whether a particular sub-cycle of a complete change cycle has been completed.

Furthermore, it is an object of the present invention to provide a controller for a cassette changing apparatus which will detect a failure condition upon the occurrence of a first one of a pair of events prior to a second one of said pair of events.

It is still a further object of the present invention to provide a controller for a cassette changing apparatus which will terminate operation of the changer when a predetermined amount of powered displacement of a driving member fails to move a cassette from a first location to a second location.

It is also an object of the present invention to provide a controller for a cassette changing apparatus which is a state machine using a simplified read only memory which may be easily constructed and which will attempt to correct a jammed condition by entering a reciprocal state and then complete a sub-cycle associated with a previous state.

These and other objects of the present invention will become apparent from the description to follow.

BRIEF DESCRIPTION OF THE DRAWINGS

FIG. 1 is a pictorial view of the interior of the preferred embodiment of the mechanical portions of the present invention.

FIG. 2 is a diagrammatic pictorial view of the channel housing, the transport load mechanism, and the cassette eject mechanism of the preferred embodiment.

FIG. 3 is a side view of the channel housing, showing a follower arm of the eject carriage in an extended position for moving a cassette.

FIG. 4 is a vertical cross-section of the apparatus shown in FIG. 1 taken along line 4—4 of FIG. 1.

FIG. 5 is a rear elevational view of the apparatus shown in FIG. 1.

DETAILED DESCRIPTION

Figure 6B:
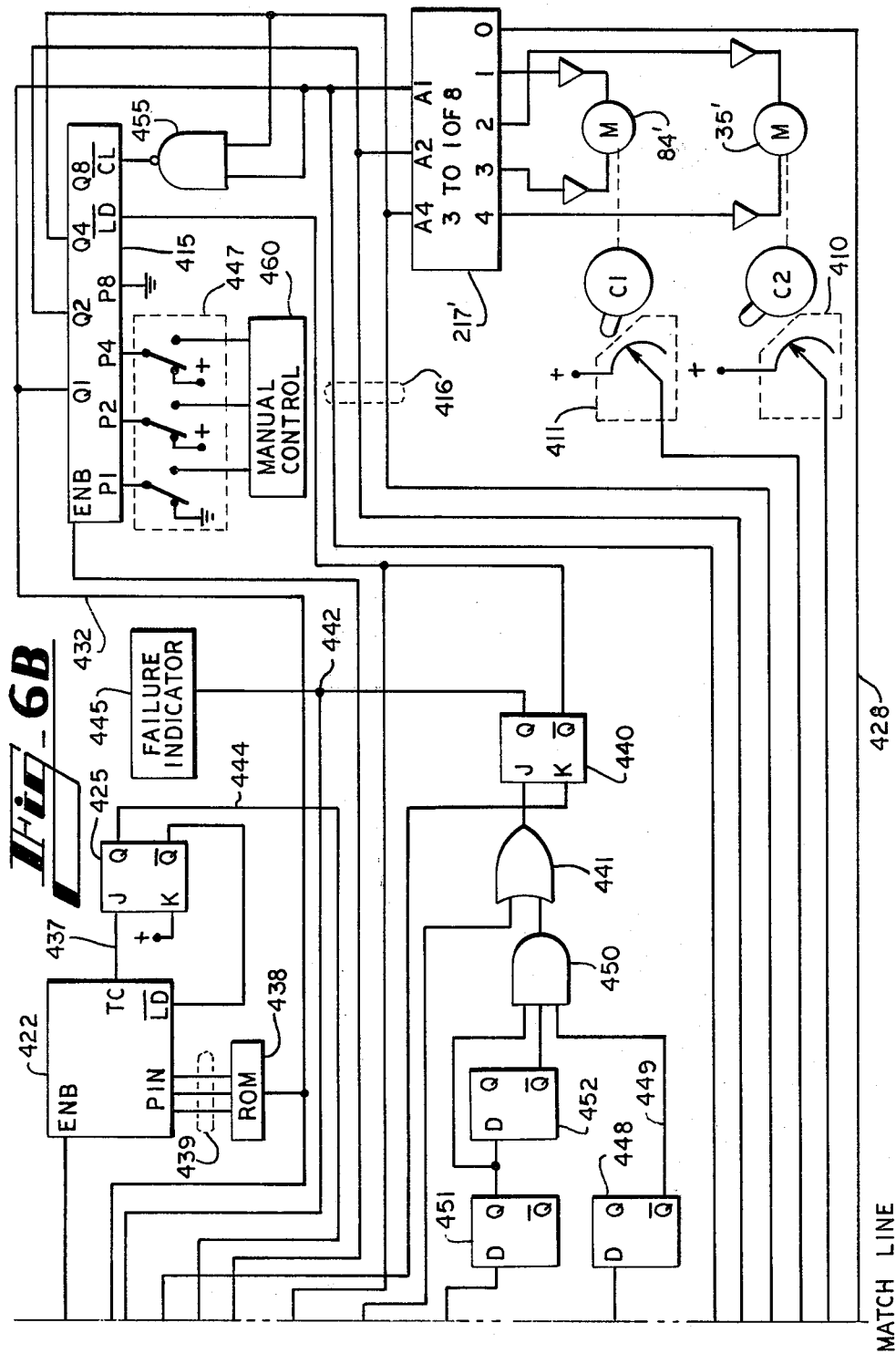
FIG. 6 (comprised of A and B) is a schematic diagram of a first preferred embodiment of the present invention.

Turning first to FIG. 1, a pictorial of the interior of the cassette changing apparatus with the upper portion of the channel housing broken away is shown. Throughout the several views shown in the drawings, like numbers are used to designate like parts and similarly said numbers correspond to the numbers given the same parts in Application Ser. No. 78,232.

The mechanical transport features of the preferred embodiments of the present invention are illustrated in FIGS. 1-5. The mechanical operation of this apparatus is described fully in co-pending Application Ser. No. 78,232. However, for convenience, certain salient features will be reiterated. In the present invention cassettes are moved along a channel member 12 by the action of an elongated worm gear 32 which drives followers 38 and 48. Followers 38 and 48 are coupled to worm gear 32 through driven spur slip clutch gears (not shown) thereby providing soft drive between worm gear 32 and the followers. Arms 42 and 49 of followers 38 and 48 respectively convey the cassettes from input store 14 to a play position corresponding to channel element 77 and on to output stores 16 and 17. As may be seen from FIG. 1, the distance from the home position of the load follower 38 at actuator 63 to the load position at actuator 66 is less than the distance from the load position to the first eject position at actuator 68. This is indicated on FIG. 1 by noting that distance D2 is greater than distance D1.

Also as was noted in Application Ser. No. 78,232, closures of the limit switches shown in FIG. 5 are indicative of when followers 38 and 48 arrive at certain positions. It will be apparent that closure of limit switch 62 corresponds to the condition of load follower 38 being home; closure of limit switch 64 corresponds to the eject follower 48 being at the home position; limit switch 65 detects load follower being at the load position; and, limit switches 67 and 69 detect the eject follower being at the normal eject position or the priority eject position, respectively.

It will therefore be appreciated that followers 38 and 48 comprise a means for moving a cassette from a first location to a second location in response to powered angular displacement of the shaft of motor 35. Angular displacement of the motor shaft is powered displacement of a driving member.

Limit switches 123 and 126 shown in FIGS. 2 and 5 are responsive to the rotation of shaft 83 which controls load arm 76 and eject slides 100 and 101 as was described in co-pending Application Ser. No. 78,232, there is a soft non-positive drive between rotary motion of shaft 83 and possible rotational directions about its longitudinal axis without regard to whether or not shaft 80 has rotated.

It will be appreciated that channel section 77 also comprises a means for moving a cassette from a first location to a second location in response to powered angular displacement of the shaft of motor 84.

In FIG. 5, cam C2 which is responsive to rotation of the shaft of motor 35 to close switch 410 is shown. On FIG. 1, cam C1 which is responsive to rotation of the shaft of motor 84 to close switch 411 is shown.

As was fully described in Application Ser. No. 78,232, a normal change cycle for the apparatus shown herein begins when load arm 76 and cassette 15 are lowered into a position on the transport including capstan 95 and spindle 94 shown in FIG. 4. Load arm 76 is raised to its uppermost position as shown in FIG. 4 by rotation of shaft 83 in a counterclockwise direction as shown in FIG. 2. Rotation of lead screw 32 then begins causing follower 38 to move a cassette 15 from the input store 14 to a load position and the cassette upon which recording has just been completed to be moved by follower 48 to one of the output stores 16 or 17. Then shaft 83 is rotated in an opposite direction to lower the newly provided cassette to the transport and to eject the previous cassette into one of the output stores as described in 078,232. When this operation is completed, lead screw 32 rotates in its opposite direction returning the followers 38 and 48 to their home positions.

Figure 7A:
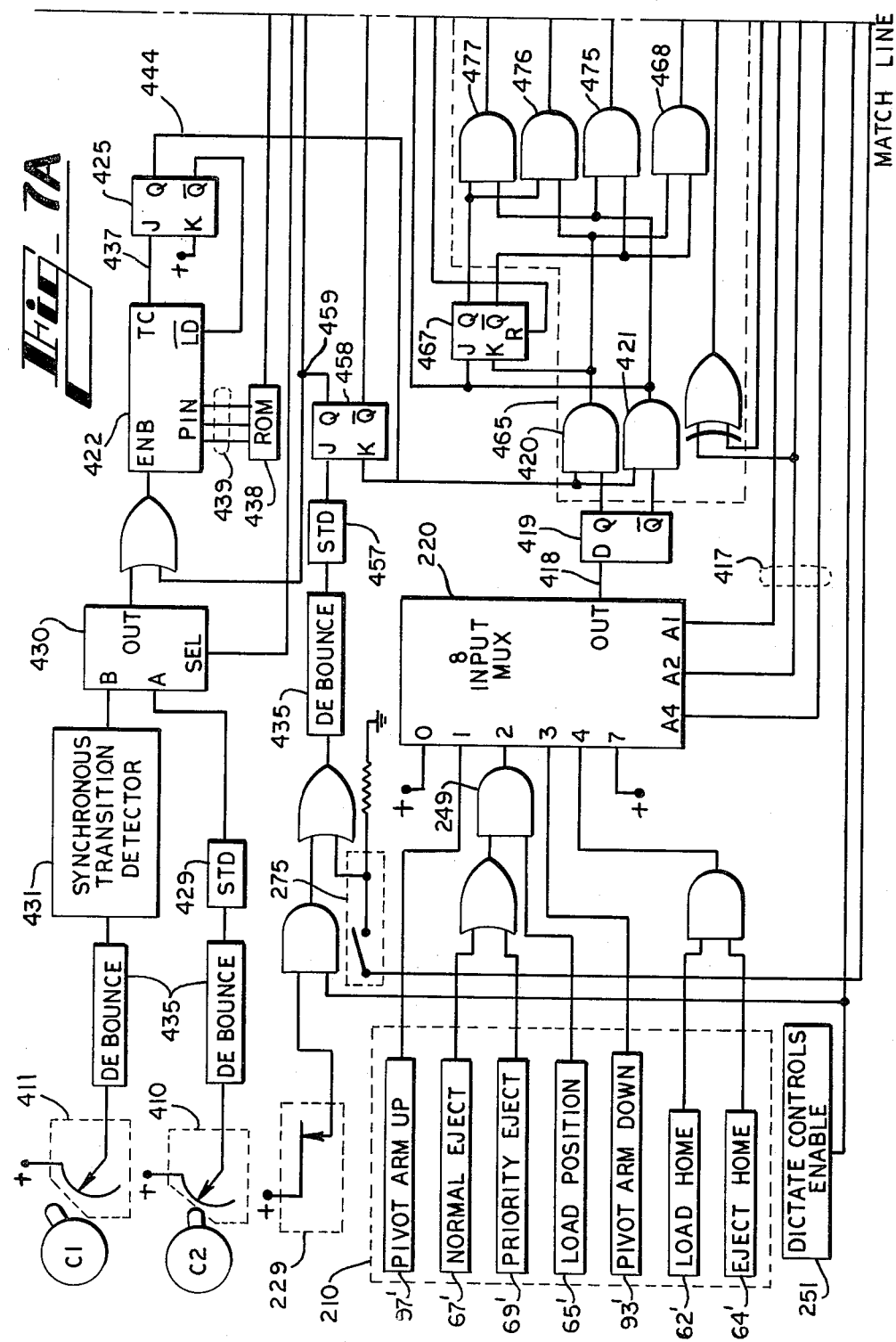
FIG. 7 (comprised of A and B) is a schematic diagram of a second preferred embodiment of the present invention.

FIGS. 6 and 7 show the preferred embodiments of the controllers of the present invention. From the descriptions thereof to follow it will be appreciated that these preferred embodiments control the change cycle and the sub-cycles thereof for the preferred embodiment in a manner which is independent of time and depends only upon the sequence upon which certain events occur without regard to the time they take. Both embodiments provide error tests which occur as a function of the number of rotations of the motors or other rotational members in the apparatus. Turning now to FIG. 6, the first and simpler preferred embodiment of the time independent controller of the present invention is shown.

It is to be understood that the first preferred embodiment of the time independent controller shown in FIG. 6 operates synchronously off a high speed clock and that all counters and flip-flops have clock inputs tied to a common clock. The preferred embodiments of the present invention contemplate using a high speed clock having a frequency on the order of hundreds of kilocycles. It will therefore be appreciated that with frequencies in this range having periods many orders of magnitude shorter than the time period between any two significant events in the mechanical change cycle, the operation of the present invention is virtually independent of clock frequency. It will further be appreciated that a straightforward transformation of the disclosed preferred embodiments to purely sequential logic may also be made by those skilled in the art.

The first preferred embodiment of the time independent controller shown in FIG. 6 is responsive to one of two conditions which indicates that some mechanical failure has occurred within the changer mechanism. The first condition is closure of a second limit switch prior to closure of a first limit switch wherein normal operation of the device requires that the first limit switch close first. The second condition is failure of one or more limit switches to be closed in response to a predetermined angular displacement of one of motors 84 or 35. It will therefore be appreciated that the first preferred embodiment shown in FIG. 6 is responsive only to a sequence of events in order to determine whether a failure has occurred and such failure detection is independent of the time required for any portion of a change cycle to normally take place.

Turning to FIG. 6, it may be seen that the first preferred embodiment comprises a simple and inexpensive controller for the cassette changer of the present invention. As was set forth in application Ser. No. 078,232, the change cycle of the cassette changer of the present invention may be conveniently subdivided into four sub-cycles corresponding to four states of a state counter 415. State counter 415 may be conveniently embodied by a binary counter having synchronous negated load (LD) and synchronous negated clear (CL) inputs as well as a count enable (ENB) input to control counting.

The three least significant bits of counter 415 comprise state indicator bits 416 shown in FIG. 6. State indicator bits 416 control the input of multiplexer 220 which is provided on line 418 as an input to D-type flip-flop 419. The two least significant bits select the inputs to four bit multiplexers 426 and 427. The state indicator bits 416 also control the output of a three line to one of eight decoder 217' which drives motors 35 and 84 (shown as 35' and 84' in FIG. 6) and (through its output on line 428) enables eject switch 229 to begin a change cycle.

As may be seen from FIG. 6, cam C1 which is associated with motor 84' and cam C2 which is assocprovided to debouncing circuits 435 which provide outputs to synchronous transistion detectors 429 and 431, respectively. The output of synchronous transistion detectors 439 and 431 are provided to a one of two data selector 430, the input of which is selected by the least significant state indicator bit appearing on line 432. It will be appreciated by those skilled in the art that synchronous transistion detectors 429 and 431 may be constructed using a pair of D-type flip-flops and one two input gate. In the preferred embodiment of the present invention, transition detectors 429 and 431 are responsive to positive transitions on the output of debounce circuits 435.

Counter 422 is responsive to count closures of switches 410 and 411. It will be appreciated by those skilled in the art that with an appropriate state on line 432 selecting an output of one of transition detectors 429 or 431, the output of data selector 430 will go high for one clock period upon each closure of switch 410 or 411 and that this one clock period pulse will propagate through OR gate 436 to enable counter 422 to count one increment.

It will be appreciated by those skilled in the art that counter 422 may also include some form of prescaler in that the particular count which causes counter 422 to reach its terminal count and provide a logical one on line 437 may be selected from knowing how many closures of switches 410 or 411 correspond to a predetermined amount of angular displacement for motors 35 and 84.

Read only memory (ROM) 438 is shown as having outputs to parallel inputs 439 of counter 422. ROM 438 is indicated as being responsive to the least significant state indicator bit from line 432. It will be appreciated that ROM 438 may be a plurality of switches, connections, inverters, gates or any other suitable means of loading an appropriate number into counter 422 depending on the state of line 432 whenever the counter 432 receives a load instruction.

In the first preferred embodiment shown in FIG. 6, flip-flop 440 will set in the event of a detected failure when a one is provided from OR gate 441. Therefore the two inputs to OR gate 441 correspond to the two failure conditions which may be detected by the first preferred embodiment.

As may be seen by those skilled in the art, the counting to a terminal count of counter 422 sets flip-flop 425 which provides a one on test output line 444. The one on line 445 strobes AND gates 420 and 421 to test the state of flip-flop 419. When the appropriate output from multiplexer 220 has been present on line 418 for at least one clock period indicating that the selected input to multiplexer 220 is in its logical one state, the output of AND gate 420 will go high when test line 444 goes high enabling state counter 415 to increment in a normal fashion. Since the K input to flip-flop 425 is tied to a logical one, the flip-flop will clear upon the next clock transition. The setting of flip-flop 425 causes counter 422 to be conditioned to load from its parallel inputs 439 upon the next occurrence of a clock transition without regard to the state of its enable input. It will therefore be appreciated that counter 422 may be embodied conveniently by a counter having inputs which correspond to the inputs of a TTL 74163 counter with appropriate prescaler.

If upon completion of a predetermined amount of angular displacement by motor 35 or 84 (signaled by a one on line 437) the appropriate input to multiplexer 220 has not gone to a logical one, the strobing of AND gates 420 and 421 will cause the output of AND gate 421 to go high and hold the output of AND gate 420 low. This logical one will propagate through OR gate 441 setting failure indicator flip-flop 440 upon the next clock transition. The setting of flip-flop 440 causes a logical one to appear at point 442 which activates failure indicator 445 and conditions switch 275 to provide a logical one to point 446 upon operation of said switch. Failure indicator 445 may be embodied by any combination of visible or audible indicators which will alert an attendant that a failure in the particular changer controlled by the controller of FIG. 6 has taken place.

Setting of flip-flop 440 also causes counter 415 to be loaded with binary 110. The loading of 110 in counter 415 prevents any connected output of decoder 217' from being activated and provides a logical one from the six input of multiplexer 220 to line 418.

The other failure mode which may be detected by the controller of FIG. 6 is the failure of a pair of limit switches to close in proper sequence during a particular sub-cycle.

As will be apparent from the detailed description of each individual sub-cycle in co-pending application Ser.

No. 78,232, the end of each sub-cycle of a complete change cycle for the cassette changer of the present invention includes closure of two limit switches. For sub-cycles during which motor 35 is driving worm gear 32, one limit switch each will be closed by followers 38 and 48. During sub-cycles involving rotation of shaft 83 by motor 84, limit switches 123 and 93 will be closed when load arm 76 is being lowered and limit switches 126 and 97 will be closed when load arm 76 is being raised (see FIGS. 2 and 4).

Since there is a soft drive connection through leaf spring 92 between shaft 83 and load arm 76 (FIG. 2) it is apparent that limit switches 123 and 126 may be easily adjusted so that limit switches 96 and 97 should close prior to the corresponding limit switch detecting rotation of shaft 83. Therefore, when shaft 83 is rotated to a position which closes limit switch 123 or 126 it is apparent that the corresponding limit switch 96 or 97 should have already closed. Limit switches 123 and 126 are represented as maximum rotation outputs 123' and 126' on FIG. 6.

Also as may be seen from FIG. 1, the distance D2 from the load position to the first eject position is greater than the distance from the input store 14 to load position (D1) and therefore load position limit switch 65 should close prior to either of the eject limit switches 67 or 69 during rotation of worm gear 32. Similarly, when worm gear 32 is rotated in the opposite direction, load follower 38 should reach its home position prior to eject follower 48 reaching its home position.

In the first preferred embodiment shown in FIG. 6, four input multiplexer 426 selects the limit switch from inputs 210 which should close first during the sub-cycle indicated by state indicator bits 416. Multiplexer 427 selects the limit switch which should close second during normal operation of the sub-cycle.

When a particular sub-cycle is proceeding normally, the output of multiplexer 426 will go high prior to the output of multiplexer 427 going high and therefore a logical zero will be provided from D flip-flop 448 along line 449 to AND gate 450. This prevents any transition from occurring on the output of AND gate 450 without regard to the state of the remaining two inputs to this gate.

The output of multiplexer 427 is connected to a pair of D-type flip-flops 451 and 452 which, together with AND gate 450 comprise a positive transition detector. It will therefore be appreciated that line 449 may be considered an enable input to the transition detector made up of flip-flops 451, 452 and AND gate 450. If line 449 is a logical one indicating that no output is being provided from multiplexer 426, the output of AND gate 450 will go high for one clock period when the limit switch from multiplexer 427 closes thus indicating that the limit switch which should have closed second during the sub-cycle closed first. The output from AND gate 450 propagates through OR gate 441 and sets failure indicator flip-flop 440.

Whenever the limit switch selected by multiplexer 426 is closed prior to the second limit switch selected by multiplexer 427, the zero on line 449 will disable the transition detector and thus no failure indication will occur.

It will therefore be appreciated that the provision of logical ones by flip-flops 451 and 452 to AND gate 450 comprises a provision of a test condition for testing for the presence of a cassette at a destination as detected by flip-flop 448.

It will be apparent to those skilled in the art that when state counter 415 is in its five state (binary 0101) that the next occurrence of a clock transition will cause counter 415 to clear because of the presence of NAND gate 455. This forces counter 415 to its 00 state which is a quiescent state of the controller of FIG. 6. The zero output of decoder 217' is activated placing a logical one on line 428 during the zero output. This enables the dictate station controls shown as a block 251. It will be apparent to those skilled in the art that when the controller of FIG. 6 is in its zero state, the cassette changer shown herein and in application Ser. No. 078,232 will be enabled to record dictation in a conventional manner.

'The logical one on line 428 is also provided as an input to AND gate 456. The other input to this gate is eject switch 229 which starts the change cycle. As may be seen from FIG. 6, operation of eject switch 229 when line 428 is high provides a pulse through a debounce circuit 435 to synchronous transition detector 457 which sets flip-flop 458. The setting of flip-flop 458 provides a logical one at point 459 which enables counter 422 to count continuously and clears flip-flop 440 in the event that it has been set. When counter 422 overflows (which will happen almost instantaneously), flip-flop 425 is set enabling counter 415 to count to its 0001 state and clearing flip-flop 458 due to the logical one on line 444.

In the event that flip-flop 440 has been set, the negated output of flip-flop 440 remains zero thus causing state counter 415 to load the data at its parallel inputs upon each clock transition. Switches 447 will then be moved in order that they may be manipulated to manually force the controller of FIG. 6 into different states which will cause motors 84' and 35' to operate.

When the jam condition has been corrected by an attendant, switches 447 should be moved manually back to the postion shown in FIG. 6 and reset switch 275 should be operated. The replacing of switches 447 in the position shown loads 0110 to counter 415. Since a logical one is present at point 442 from failure indicator flip-flop 440, the operation of switch 275 causes flip-flop 458 to set and the sequence of events described above for initiation of the change cycle is repeated. When counter 415 is enabled, it counts to its 0111 state which is detected by NAND gate 455 which thus clears the counter and causes the controller of FIG. 6 to be in its ready state, 0000.

From the foregoing it will be appreciated that the first preferred embodiment of the time independent controller of the present invention will control the cassette changer shown in FIGS. 1-5. Because of the combination of positive and nonpositive drive in the mechanical portions of the cassette changer, it can provide a failure indication (failure indicator 445) which terminates operation of motors 35 and 84 and is responsive only to an improper sequence of closing of limit switches embodying inputs 210 or the failure of certain of inputs 210 to become active after motors 84' and 34' have turned their shafts through a predetermined angular displacement.

Turning now to FIG. 7, an alternate preferred embodiment for the time independent controller of the present invention is shown. Parts which are the same as those of the first preferred embodiment of FIG. 6 are referenced with the same numerals.

As may be seen from FIG. 7, cams C1 and C2 operate switches 411 and 410 in the same manner as previously described. Similarly counter 422 and the steering logic associated therewith keeps track of the angular displacement of motors 84' and 35'.

The second preferred embodiment of FIG. 7 embodies the features of the controller described in application Ser. No. 78,232 which will attempt to correct jammed conditions by causing the controller to enter a reciprocal state and execute a reciprocal sub-cycle. The states and their reciprocals are fully described in application Ser. No. 78,232.

As in FIG. 6, all flip-flops and counters, including the flip-flops of synchronous transition detectors 429, 431, and 457 are tied to a common clock having a clock signal characterized by a period multiple orders of magnitude shorter than the time it takes any two events of significance in the cassette changer to occur. Therefore the synchronous embodiment of FIG. 7 controls the apparatus shown in FIGS. 1-5 in a manner which is independent of the time it takes for normal cycles to occur.

The second preferred embodiment is controlled by a read only memory which is shown as the devices enclosed by block 465. It will be apparent to those skilled in the art that the devices shown within block 465 may be used to embody a read only memory which will control the alternate preferred embodiment or that some other more conventional form of read only memory may also be provided. Therefore mask programmable read only memories may be used as well as erasable programmable memories. It will be apparent to those skilled in the art that certain inputs into block 465 are both the asserted and negated forms of certain variables within the alternate preferred embodiment and that a conventional read only memory could be made with fewer inputs than the input lines crossing the boundary of block 465.

From the above description of angular displacement counter 422 and the description of sub-cycle execution in application Ser. No. 078,232, the operation of the alternate preferred embodiment of FIG. 7 will be easily understood by those skilled in the art. In place of state counter 415 of the first preferred embodiment a plurality of D-type flip-flops 461-463 are the flip-flops controlling the state of state indicator bits 417. The state indicator bits 417 comprise the asserted form of the outputs of flip-flops 461-463.

A plurality of data selectors 466 determine whether the inputs to decoder 217' come from state flip-flops 461-463 or from manual controls 460. It will be appreciated by those skilled in the art that the combination of adder 470, flip-flops 461-463, and data selectors 466 is analagous to state counter 415. Particularly note that the select inputs of data selectors 466 serve the same function as the load input to state counter 415.

During normal cycling through the sub-cycles of a change cycle, a three bit adder 470 is used to increment the state represented by the outputs of flip-flops 461-463 by one. Note that the outputs of the state flip-flops are provided to the A inputs of adder 470 on three bit bus 478 and that detection of the proper closure from inputs 210 through the output of multiplexer 220 when test strobe line 444 goes high will cause the carry in (CI) input from AND gate 468 to go high thus incrementing the number previously represented on the outputs of the state flip-flops. A carry in input from AND gate 468 is provided when the combination of D flip-flop 419 and AND gates 420 and 421 is strobed at the end of the count of counter 422 in the same manner as these elements operate in the first preferred embodiment. One other condition must apply for output of AND gate 468 to go high: repeat flip-flop 467 must be cleared.

Repeat flip-flop 467 is set whenever a failure to achieve closure of the appropriate input 210 upon completion of a predetermined angular displacement is detected by a logical one appearing at the output of AND gate 421.

Note that AND gates 468 and 475-477 detect four possible combinations of the state of flip-flop 467 and the states of AND gates 420 and 421. Of course when test strobe line 445 is low, all the outputs of gates 468, 475-477 will be low.

The setting of flip-flop 467 indicates that the next state to be entered by the controller of FIG. 7 is the reciprocal state of the state which has just failed. This event enables gates 476 and 477.

Note also that each time a logical one appears at the J input of flip-flop 467 failure counter 479 is enabled in order to keep track of the number of times a reciprocal state has been entered in response to a failure. It will be appreciated by those skilled in the art that counter 479 may be loaded to the predetermined number in order to provide predetermined number of attempts to correct a failure to complete a sub-cycle prior to the controller "giving up".

It will be apparent to those skilled in the art that the combination of gates set forth within read only memory 465 will increment the state flip-flops during normal operation and will cause flip-flops 461-463 to enter a reciprocal state upon failure of the apparatus shown in FIGS. 1-5 to successfully execute any particular sub-cycle.

Note that AND gate 477 detects the failure to complete a reciprocal sub-cycle since the output of gate 477 is active only when repeat flip-flop 467 is set and the output of AND gate 421 goes high. In the event that the output of AND gate 477 goes high its output is provided through OR gate 480 to set failure indicator flip-flop 440. This situation indicates the device is unable to go forward and unable to back up. The other event which provides an output to OR gate 480 is the overflow of failure counter 479. When counter 479 has detected that a predetermined number of attempts to repeat a sub-cycle have occurred within any given change cycle the counter will provide a logical one on line 481 from its terminal count (TC) output.

Note that whenever flip-flop 458 indicating the beginning of change cycle or the resetting of the controller is set, failure counter 479 will be loaded to a number corresponding to the predetermined number of failures per change cycle which will be tolerated.

Note that the setting of failure flip-flop 440 provides a logical one on line 485 which is connected to the direct set inputs of state flip-flops 461-463. This forces the state of the alternate preferred embodiment of FIG. 7 to its 111 state whenever failure indicator 445 is activated. Note that setting of flip-flop 440 also changes the state of the select inputs to data selectors 466 and causes the output of manual controls 460 to be provided to decoder 217'. This allows an attendant to manipulate manual controls 460 which may be embodied as a plurality of switches, a thumb wheel switch or any other suitable means for providing a binary number input to decoder 217 to control the operation of the changer. When the failure condition has been cleared by the operator, reset switch 275 is activated in the same manner as reset switch 275 described hereinabove in connection with FIG. 6. This sets flip-flop 458 which causes counter 422 to count through an entire cycle and clears flip-flop 440. Under the described conditions state indicator flip-flops 461–463 will all remain ones despite the removal of their direct set inputs until test strobe line 444 goes high. Upon this event the logical one from the seven input of multiplexer 220 is provided through flip-flop 419 to activate AND gate 420 which causes the carry in input (CI) of adder 470 to go high causing the outputs of the adder to all be zeros thus returning all of state flip-flops 461 through 463 to their zero output. This is the ready state of the controller of FIG. 7.

From the foregoing it will be appreciated that the alternate preferred embodiments of the time independent controller of the present invention shown in FIGS. 6 and 7 are by way of example and that other embodiments of the present invention within the scope of the claims below may be constructed.

We claim:

1. In an apparatus for successively engaging a plurality of discrete recording media with a transport mechanism comprising
    a carriage means for moving one of said discrete recording media from a first location to a second location,
    drive means for providing powered displacement of a driving member, the improvement of:
    a coupling means for connecting said carriage means and said driving member of said drive means for moving said carriage means in response to said powered viding a displacement output signal proportional to total displacement of said driving member from a starting point;
    a control means for terminating operation of said drive means in response to detection of a failure of said carriage means to move from said first location to said second location when said displacement output signal has reached a predetermined value.

2. In a changer apparatus for successively engaging a plurality of discrete recording media with a transport mechanism upon each occurrence of a change cycle in said changer apparatus, said change cycle comprising a plurality of sub-cycles,
    each sub-cycle being characterized by at least one carriage moving one of said discrete recording media from a first location to a second location,
    said apparatus including drive means for providing powered displacement of a driving member, the improvement of:
    a coupling means connecting said carriage means and said driving member of said drive means for moving said carriage means in response to said powered displacement of said driving member, said coupling means permitting continuation of said powered displacement when said carriage means is physically restrained;
    displacement detection means coupled to said driving member for providing a displacement output signal proportional to total displacement of said driving member from a starting point;
    a control means for terminating said sub-cycle of said change cycle and for initiating a reciprocal sub-cycle in response to detection of a failure of said carriage means to move from said first location to said second location when said displacement output signal has reached a predetermined value.

3. In an apparatus for successively engaging a plurality of discrete recording media with a transport mechanism comprising
    a carriage means for moving one of said discrete recording media from a first location to a second location,
    drive means for providing powered displacement of a driving member coupled to said carriage means, the improvement of:
    displacement detection means coupled to said driving member for providing a displacement output signal proportional to total displacement of said driving member from a starting point;
    a control means for terminating operation of said drive means in response to detection of a failure of said carriage means to move from said first location to said second location when said displacement output signal has reached a predetermined value, said predetermined value of said displacement output signal corresponding to normal movement of said carriage means from said first location to said second location.

4. In a changer apparatus for successively engaging a plurality of discrete recording media with a transport mechanism upon each occurrence of a change cycle in said changer apparatus, said change cycle comprising a plurality of sub-cycles,
    each sub-cycle being characterized by at least one carriage moving one of said discrete recording media from a first location to a second location,
    said apparatus including drive means for providing powered displacement of a driving member, the improvement of:
    a coupling means connecting said carriage means and said driving member of said drive means for moving said carriage means in response to said powered displacement of said driving member;
    displacement detection means coupled to said driving member for providing a displacement output signal proportional to total displacement of said driving member from a starting point;
    a control means for terminating said sub-cycle of said change cycle and for initiating a reciprocal sub-cycle in response to detection of a failure of said carriage means to move from said first location to said second location when said displacement output signal has reached a predetermined value, said predetermined value of said displacement output signal corresponding to normal movement of said carriage means from said first location to said second location.

5. Apparatus as recited in claims 1, 2, 3, or 4 wherein said coupling means comprises a worm gear coupled to said drive means, a spur gear engaged with said worm gear for displacement parallel to the longitudinal axis of said worm gear when said worm gear is rotating, and a slip clutch for coupling said spur gear to said carriage means.

6. Apparatus as recited in claims 1, 2, 3, or 4 wherein said drive means comprises an electric motor and said powered displacement comprises angular displacement of a shaft of said electric motor.

7. Apparatus as recited in claims 1, 2, 3, or 4 wherein said coupling means comprises a first shaft rotatably coupled to said drive means including a cam mounted on said first shaft;
    a second shaft having a longitudinal axis substantially parallel to the longitudinal axis of said first shaft, said carriage means being connected to said second shaft for angular movement about said longitudinal axis of said second shaft; and
    a leaf spring coupled to said second shaft for causing said angular movement in response to movement of said cam.

* * * * *